United States Patent
Kirzner et al.

(10) Patent No.: US 6,665,298 B1
(45) Date of Patent: Dec. 16, 2003

(54) REASSEMBLY UNIT AND A METHOD THEREOF

(75) Inventors: Eran Kirzner, Rishon Le-Zion (IL); Yuval Lachman, Naharia (IL); Avi Hagai, Herzelia (IL); Itai Katz, Rehovot (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/494,601

(22) Filed: Jan. 31, 2000

(51) Int. Cl.[7] .................................................. H04J 3/22
(52) U.S. Cl. ........................ 370/395; 370/415; 370/516
(58) Field of Search ................................. 370/229, 230, 370/230.1, 235, 235.1, 236, 395.1, 398, 395.4, 412, 428, 429, 464, 474; 710/52, 53, 56, 57, 60; 709/234

(56) References Cited

U.S. PATENT DOCUMENTS

| | | | |
|---|---|---|---|
| 5,297,139 A | * 3/1994 | Okura et al. | 370/428 |
| 5,473,604 A | * 12/1995 | Lorenz et al. | 370/229 |
| 5,539,747 A | * 7/1996 | Ito et al. | 370/235 |
| 5,734,653 A | 3/1998 | Hiraiwa et al. | 370/395 |
| 5,905,870 A | * 5/1999 | Mangin et al. | 709/234 |
| 5,914,954 A | 6/1999 | Nakayama | 370/394 |
| 5,978,355 A | 11/1999 | Yamaguchi | 370/230 |
| 5,982,783 A | 11/1999 | Frey et al. | 370/467 |
| 6,131,144 A | * 10/2000 | Koppala | 711/132 |
| 6,327,249 B1 | * 12/2001 | Cookman et al. | 370/235 |

* cited by examiner

*Primary Examiner*—Huy D. Vu
*Assistant Examiner*—Daniel Ryman

(57) ABSTRACT

A reassembly unit comprising of a reassembly buffer and a control unit and a detector. The reassembly unit monitors an amount of data AMD stored in the reassembly register and compares AMD to four thresholds, TS1, TS2, TS3 and TS4. TS1 and TS4 define the size of the reassembly buffer. TS2 defines the delay of reassembly unit 40. A difference between TS1 and TS2 defines an underflow recovery period in which data is not read out of the buffer. A difference between TS4 and TS3 define an overflow recovery period in which data is not written in the buffer. The four thresholds can be changed during an operation of the reassembly unit, allowing a user to adjust the thresholds according to the state of the reassembly unit.

22 Claims, 4 Drawing Sheets

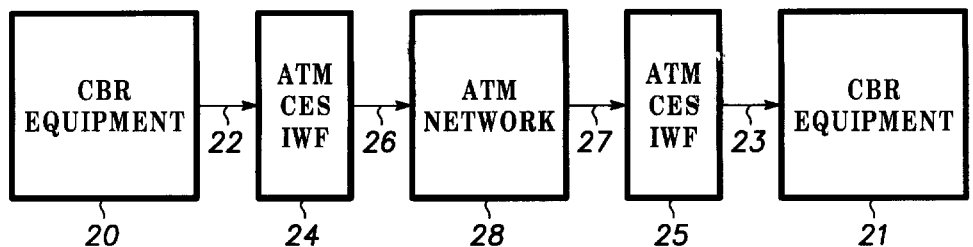
FIG. 1 - PRIOR ART -
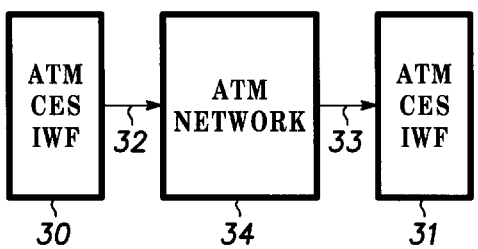
FIG. 2 - PRIOR ART -
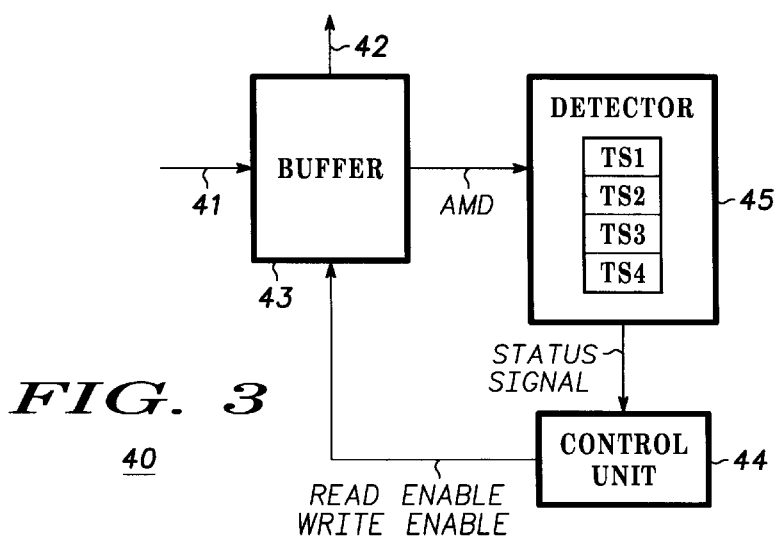
FIG. 3

REASSEMBLY UNIT AND A METHOD THEREOF

FIELD OF THE INVENTION

The present invention in general relates to apparatus and method for reassembling data cells or packets provided by a first communication channel to a stream of data cells or packets to be provided to a second communication channel. The present invention especially relates to an apparatus and a device for reassembling ATM data cells according to a constant bit rate CBR stream of data.

BACKGROUND OF THE INVENTION

Reassembly buffer is adapted to receive data cells from one communication channel and provide data cells to a second communication channel in a manner that compensates for timing differences between the writing of data cells/octets/packets (i.e.-cells) to the reassembly buffer and the reading of data cells out of the reassembly buffer.

Reassembly buffers are used in various applications, such as, but not limited to, circuit emulation systems. One type of circuit emulation circuit is specified in ATM forum specification AF-VTOA-0078. The specification describes a system that allows a plurality of constant bit rate CBR communication channels to be coupled to each other via an Asynchronous Transfer Mode (ATM) network.

ATM has been accepted universally as the transfer mode of choice for Broadband Integrated Services Digital Networks (B-ISDN). The services provided by ATM can be enhanced by providing ATM adaptation layers (AAL). AAL1 is used to carry certain types of constant bit rate (i.e.-CBR) or "circuit" traffic over ATM networks. ATM is essentially a cell oriented transmission technology and not circuit oriented technology so that the implementation of AAL1 requires emulation circuit characteristics in order to provide good support for CBR traffic.

ATM forum specification AF-VTOA-0078 specifies circuit emulation services. Two basic systems are disclosed in the specification. First system 19 is shown in FIG. 1. CBR equipment 20 and 21 are coupled, via CBR service interface 22 and 23 according to ATM Circuit Emulation Services (i.e.- CESs) interworking functions (IWFs) 24 and 25 accordingly. CES IWFs 24 and 25 are coupled, via ATM access interface 26 and 27 to two opposite ends of an ATM network 28. CES IWFs 24 and 25 extend the CBR equipment 20 and 21 to which they are connected across ATM network 28 in a manner that is transparent to CBR equipment 20 and 21. The ATM portion of first system 19 should retain its bit integrity. Second system 29 is shown in FIG. 2 in which ATM CES IWF 30 and 31 are coupled, via ATM access interfaces 32 and 33 accordingly to two opposite ends of an ATM network 34. Both first and second system 19 and 29 can handle multiple channels. Usually, CBR equipment 20, 21, 30 and 31 handle multiple channels by time division multiplexing techniques.

ATM cells are delayed while passing through ATM network 34. The delay is not constant and can vary within a Cell Delay Variation period (i.e.-CDV). Larger variations in the delay are reflected by longer CDV.

Each of CBS IWFs 24, 25, 30 and 31 can be used either to segment a constant bit rate data cell stream or to reassemble a sequence of ATM cells into streams of constant bit rate data cell stream. The reassembly function requires a buffer in which data is stored before it is transferred out of a CES IWF interface. Usually, each channel out of the multiple channels handled by first and second systems 19 and 29 has a dedicated reassembly buffer.

The buffer can overflow and underflow for various reasons: (a) when slight clocking differences exist between a CES IWF in which data cells are segmented and between a CES IWF in which these data cells are reassembled. In such a case there is a difference between a first rate in which data is written in the buffer and a second rate in which data is read out of the buffer. (b) variation in delay over the ATM network, especially when the ATM network is characterized by a relatively large CDV.

When either an overflow and an underflow occur, there is a need to perform a relatively time consuming recovery process. Usually, during an underflow predetermined data cells/packets/octets are provided to the CBR equipment, in order to maintain a constant bit rate. In some devices a last ATM cell that was written in the buffer is retransmitted until the underflow ends. In some devices a predetermined sequence of cells are provided to the CBR equipment until the underflow ends. Usually, during an overflow valid data cells are dropped from the buffer. After the overflow ends there is a need to synchronize to the ATM cell stream.

The buffer contributes to a delay of the CES IWF. Larger reassembly buffers can reduce the occurrence of overruns but can increase the delay of the CES IWF.

There is a need to provide an improved device and method for allowing the reassembly of data with minimal delay and minimizes the occurrence of underflows.

There is a need to provide a device and method for allowing the reassembly of data in a manner that minimizes the occurrence of overflows without needing vary large reassembly buffers.

BRIEF DESCRIPTION OF THE DRAWINGS

While the invention is pointed out with particularity in the appended claims, other features of the invention are disclosed by the following detailed description taken in conjunction with the accompanying drawings, in which:

FIGS. 1–2 are schematic description of circuit emulation services as defined in ATM forum AF-VTOA-0078 specification;

FIG. 3 is a schematic description of a reassembly unit, according to a preferred embodiment of the invention;

DETAILED DESCRIPTION OF THE DRAWINGS

Figure 4:
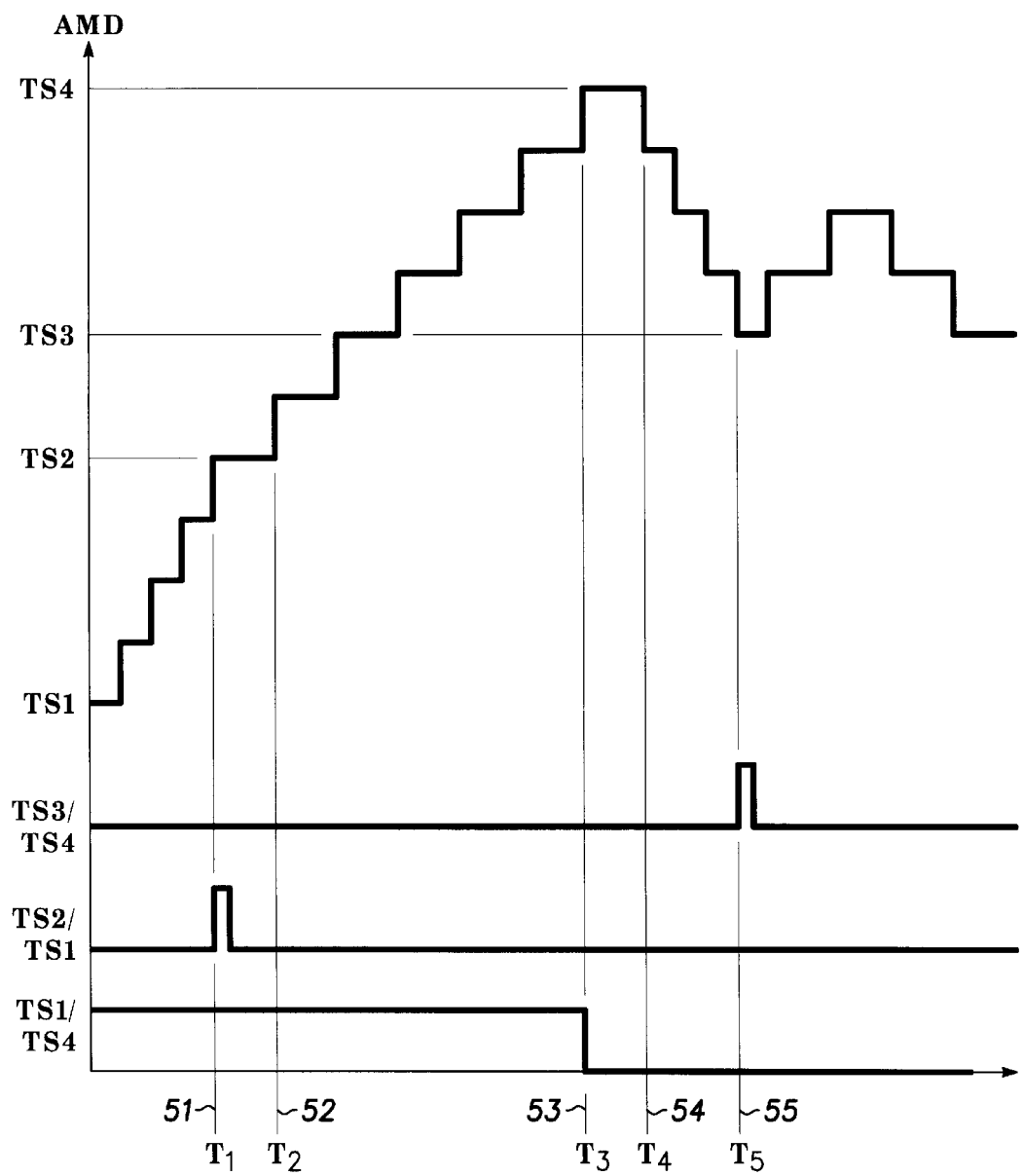
FIG. 4 is a schematic time diagram showing status signals that are generated in response to a relationship between AMD, TS1, TS2, TS3 and TS4.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a reassembly unit comprising of a reassembly buffer and a control unit and a detector. The reassembly unit monitors an amount of data AMD stored in the reassembly register and compares AMD to four thresholds, TS1, TS2, TS3 and TS4. TS1 and TS4 define the size of the reassembly buffer. TS2 and especially a difference between TS1 and TS2 define the delay of reassembly unit 40 and an underflow recovery period in which data is not read out of the buffer. A difference between TS4 and TS3 define an overflow recovery period in which data is not written in the buffer. The four thresholds can be changed during an operation of the reassembly unit, allowing a user to adjust the thresholds according to the state of the reassembly unit, and conveniently to a state of an ATM network and CBR equipment that are coupled to the reassembly buffer.

The invention provides a reassembly unit within a circuit emulation system, and especially a circuit emulation system that is coupled from a first end to an ATM network and from the other end to CBR equipment.

FIG. 3 is schematic description of reassembly unit 40, according to a preferred embodiment of the invention. Reassembly unit 40 is adapted to receive data cells from first communication channel 41, temporarily store the data cells and to provide them to second communication channel 42, in a manner that compensates for a slight clocking differences between a device in which data cells were segmented and between the reassembly unit, these slight clocking differences are reflected in slight differences between a first rate in which data cells are written in the buffer and a second rate in which data is read out of the buffer and (b) variations, fluctuations or jitter of delay of arriving data cells. Conveniently, first communication channel 41 is an ATM channel, characterized by having a CDV and second communication 42 channel is a constant bit rate CBR channel. Preferably, reassembly unit 40 is a part of either one of CES IWF 24, 25, 30 or 31. Reassembly unit 40 is coupled to ATM network 28 or 34, via ATM access interface 26, 27, 32 or 33 and is further coupled to CBR equipment 20 or 21 via CBR service interfaces 22 and 23.

Reassembly unit 40 comprising: buffer 43, detector 45 and control unit 44. Buffer 43, detector 45 and control unit 44 are coupled to each other. Buffer 43 is further coupled to first and second communication channels 41 and 42.

Buffer 43 is adapted to receive data cells from first communication channel 41, store them and provide the data cells to second communication channel 42.

Figure 5:
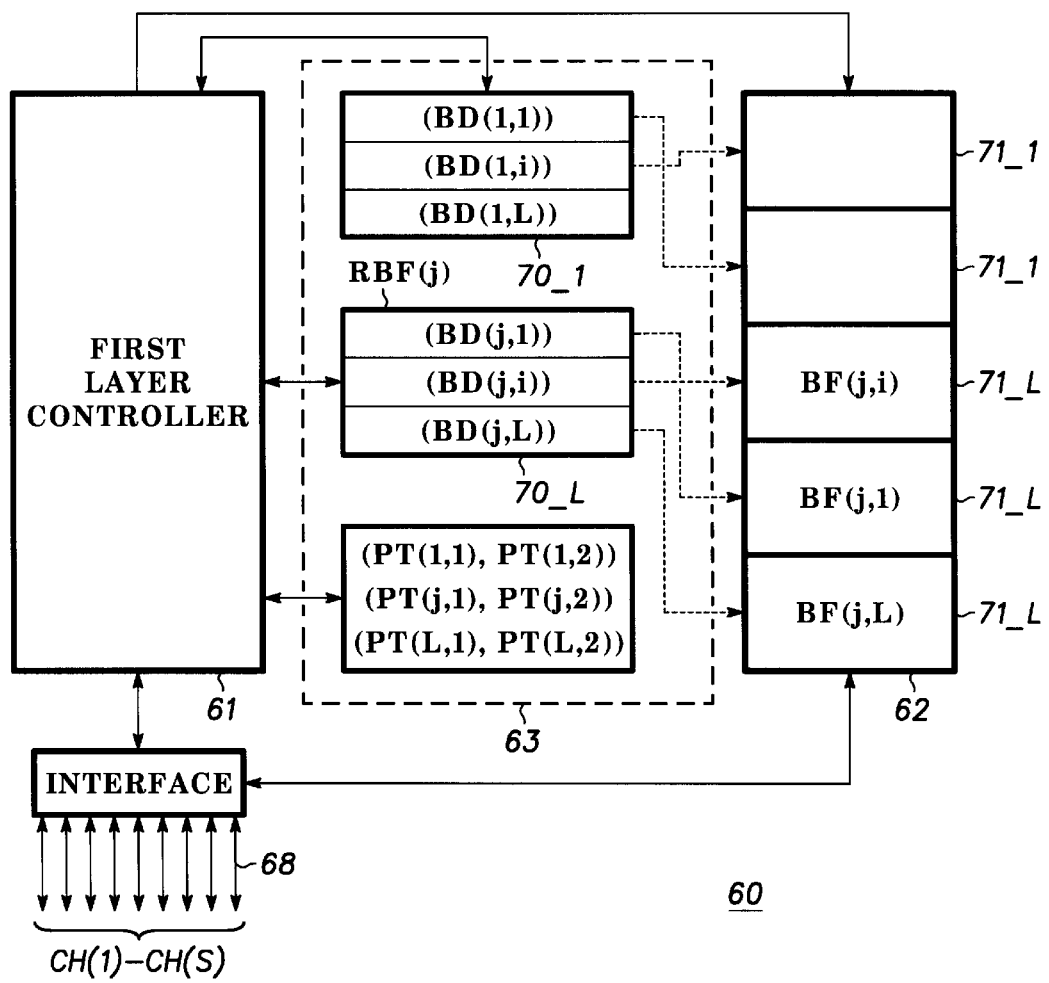
FIG. 5 is a schematic description of a communication controller having reassembly units, according to another preferred embodiment of the invention.

A variable AMD reflects an amount of data cells stored within reassembly unit 40. The data cells can be either stored within a reassembly buffer such as buffer 43 or be stored in a memory module, referenced by pointers within buffer 43. A first embodiment of the invention is shown in FIG. 3–4 and a second embodiment of the invention is shown in FIG. 5.

Referring to FIG. 3, detector 45 is adapted to detect AMD, compare AMD amount to four thresholds TS1, TS2, TS3 and TS4, and generate at least one status signal reflecting a relationship between AMD and the four thresholds. Preferably, TS1<TS2<TS3<TS4.

Control unit 44 is adapted to receive the at least one status signal and accordingly to control the access to the buffer, wherein:

(One) While AMD=TS1 control unit 44 prevents data cells from being read out of buffer 43.

(Two) After AMD reaches TS2 for a first time after being equal to TS1, and as long as TS1<AMD, control unit 44 allows data cells to be read out of buffer 43.

(Three) When AMD=TS4 control unit 44 prevents data cells to be written in the buffer.

(d) After AMD reaches TS3 for a first time after being previously equal to TS4 and as long as AMD<TS4 control unit 44 allows data cells to be written in the buffer.

(e) else, data can be both written in buffer 43 and read out of buffer 43.

(Two) As long as AMD≧TS4 an overflow occurs. Control unit 44 prevents data cells from being written in buffer 43 and allows data cells to be read out of buffer 43.

(Three) If TS3<AMD<TS4 and AMD has not reached TS3 after a overflow occurred, control unit 44 prevents data cells from being written in buffer 43.

(e) If TS2≦AMD≦TS3 data cells can both written to and read from the buffer.

Buffer 43 has a length of BF. When AMD reaches BF an overflow occurs. When AMD reached zero an underflow occurs. Conveniently, BF is a compromise between a need to minimize the occurrence of underflows and overflows and a need to reduce the size of buffer 43. Preferably, the at least one status signals are further sent to another control unit (not shown in FIG. 3) within CES IWF. The other control unit analyzes the occurrence of underflows and overflows within various periods and accordingly changes at least one of the four thresholds. For example, if a predetermined amount of overflows occur during a predetermined period, BF may incremented, and vice verse.

TS2 defines the delay of reassembly unit 40. TS2 and a difference between TS1 and TS2 is a compromise between a need to reduce the occurrences of underflows and between a need to minimize a delay of the reassembly unit 40. The occurrence of underflows can be reduced by allowing buffer 43 to accumulate enough data cells before allowing the data cells to be read out of buffer 43. The difference between TS1 and TS2 defines an underflow recovery period in which data is not read out of buffer 43. During an underflow recovery period AMD changes from TS1 to TS2. TS2 value can be set to a relatively high value when reassembly unit 40 starts to work, so that enough data cells are stored in buffer 43 before being read out of buffer 43, and to be set to a lower value during a steady state operation of reassembly unit 40.

TS3 and especially a difference between TS3 and TS4 define an overflow recovery period. An overflow recovery period starts when AMD changes its value from TS4 to TS3. During the overflow recovery period data cells are not written in buffer 43, and a synchronization unit (not shown) within CES IWF performs a synchronization sequence. The synchronization sequence assures that when the overflow recovery period ends, the reception of data by buffer 43 is synchronized with a transmission of data cells from first communication channel 41. TS3 and a difference between TS3 and TS4 are a compromise between a need to reduce the length of the overflow recovery period and a need to receive and transmit data without interference over a large range of AMD. TS3 can be set to a value much lower than TS4 when reassembly unit 40 starts to work, so that fewer overflow recovery periods occur, and to be set to a value near TS4 during a steady state operation of reassembly unit 40.

TS1, TS2, TS3 and TS4 can be adjusted by various means, such as another control unit (not shown) within CES IWF. The adjustment can be performed during the operation of assembly unit 43 or during dedicated learning periods.

Control unit 44 allows data cells to be both read out of buffer 43 and to be written in buffer 43 except during overflows, underflows, overflow recovery period and underflow recovery period. During an underflow and an underflow recovery period, data cells can not be read out of buffer 43. Data cells can not be written to buffer 43 during an overflow and an overflow recovery period.

FIG. 4 is a schematic time diagram showing exemplary status signals that are generated in response to a relationship between AMD, TS1, TS2, TS3 and TS4.

For example, TS1=0, TS2=4, TS3=6 and TS4=10.

At time t=0 reassembly unit 40 is initialized and AMD=0. At t=0 buffer 43 is in an underflow state, The underflow ends at t=T1 (51) in which an underflow recovery period starts. The underflow recovery period ends at t=T2. During the underflow recovery period data cells are written in buffer 43 but data cells are not read out of buffer 43. Thus, during this period AND increases in a fairly fast manner. Underflow recovery period ends at t=T2 (52) in which AMD=4 (AMD=TS2). From t=T2 till t=T3 (53) data cells are read out of buffer 43 and data cells are written in buffer 43. More data cells are written in buffer 43 than are being read out so that AMD increases in a fairly slow manner. At t=T3 (53) AMD reaches TS4 AMD=TS4=10 and an overflow occurs. During the overflow data cells are not written to buffer 43. On the other hand data cells are allowed to be read out of buffer 43. Accordingly AMD decreases and after at t=T4 (54) an overflow recovery period begins. The overflow recovery period ends at t=T5 (55) when AMD reaches TS3. From t=T5 data cells are both read out of buffer 43 and data cells are written in buffer 43 and AMD is between 10 (TS4) and 0 (TS1).

A variety of status signals can be provided for describing the relationships between AMD and TS1–TS4. For example, a status signal TS4/TS1 that is set when a underflow occurs and is reset when a overflow occurs. TS4/TS1 is reset from t=0 till t=T3 (53). TS1/TS2 changes its value when an underflow recovery period ends (at t=T2 (52)) TS3/TS4 changes its value when a overflow recovery period ends (at t=T5 (55)).

According to an embodiment of the invention, buffer 43 does not stores data cells but stores information about a location of the data cells. The data cells are stored in a data buffers other than buffer 43. For example, buffer 43 stores buffer descriptors, the data cells are stored in data buffers within a memory module. The data buffers are referenced by the buffer descriptors. This arrangement is very effective when CES IWF handles multiple communication channels, and there is a need to handle large quantities of data cells. The usage of buffer descriptors allow to store a portion of the data cells in an external memory and a smaller portion of the data cells in a relatively fast memory module. In such a case each CES IWF comprises of multiple buffers, such as buffer 43, each buffer handles data cells from a single communication channel. Data buffers that store data cells from a single communication channel (i.e.- a set of data buffers) form a circular queue. The buffer descriptors allow to store a relative high number of buffer descriptors in a relative concise memory space, and allow the plurality of data buffers to be handled in a very efficient manner.

FIG. 5 is a schematic description of a communication controller 60 having reassembly units, according to another preferred embodiment of the invention.

Communication controller 60 is adapted to handle multiple communication channels CH(k). Communication controller 60 has a plurality of buffers 70_1—70_L and a plurality of data buffers 71_1—71_L. A first level processor 61 replaces a plurality of control units such as control unit 44, and detectors such as detector 45.

Communication controller 60 receives data cells from a communication channel CH(k), stores a plurality of data cells from CH(k) in a data buffer BF(j,1) out of a set of data buffers BFS(j) within memory module 61. Data buffer BF(j,l) is referenced by a buffer descriptor BD(j,1) that is stored in buffer RBF(j). A first level controller 61 handles the writing in of data cells from CH(k) to another communication channel CH(q). The multiple communication channels are collectively denoted 68. First level controller 61 handles the writing in of data cells and reading out of data cells according to a predetermined scheduling scheme. First level controller 61 allocates two pointers for each buffer RBF(k), (i) an Rx pointer PT(j,1) that points to a buffer descriptor that holds a pointer to a last data cell that was provided by CH(h) and (ii) a Tx pointer PT(j,2) that points to a buffer descriptor that holds a pointer to a first data cell to be provided to CH(q).

In one embodiment of the invention, AMD is reflected by a difference between a location of buffer descriptors. First level controller 61 controls buffer RBF(k) according to a difference between pointers PT(j,1) and PT(j,2) and a relationship between this difference to four thresholds TS1(j), TS2(j), TS3(j) and TS4(j).

In another embodiment of the invention AMD is reflected by a difference between data cells within data buffers referenced by the buffer descriptors. In such a case the calculation of AMD requires information about the size of the various buffers. Preferably, there is also a need to know the exact location of data cells being read out of a buffer and being written in a buffer. This type of information can preferably be stored within each buffer descriptor, but it is not necessary. For example, it is assumed that buffer RBF(j) is comprised of eight buffer descriptors BD(j,1)–BD(j,8) that point to a start of eight data buffers BF(j,1)–BF(j,8). The first four data buffers are 1024 (1K) byte long. The last four data buffers are 2048 (2K) byte long. The data buffers can be placed in consecutive order in a memory module, but it is not necessary. If PT(j,1) points to BD(j,1) and PT(j,2) points to BD(j,6) than AMD will be equal to sum of the lengths of BF(j,1) till BF(j,5) AMD=1024+1024+1024+1024+2048=6144. Conveniently, the calculation of AMD is also based upon a location of a transmit pointer and a receive pointer within each data buffer. If, PT(j,1) points to the 526'th byte of BD(j,1) and PT(j,2) points to the 658'th byte of BD(j,6) than AMD will be equal to: (1024−526)+1024+1024+1024+2048+654=6176.

Figure 6:
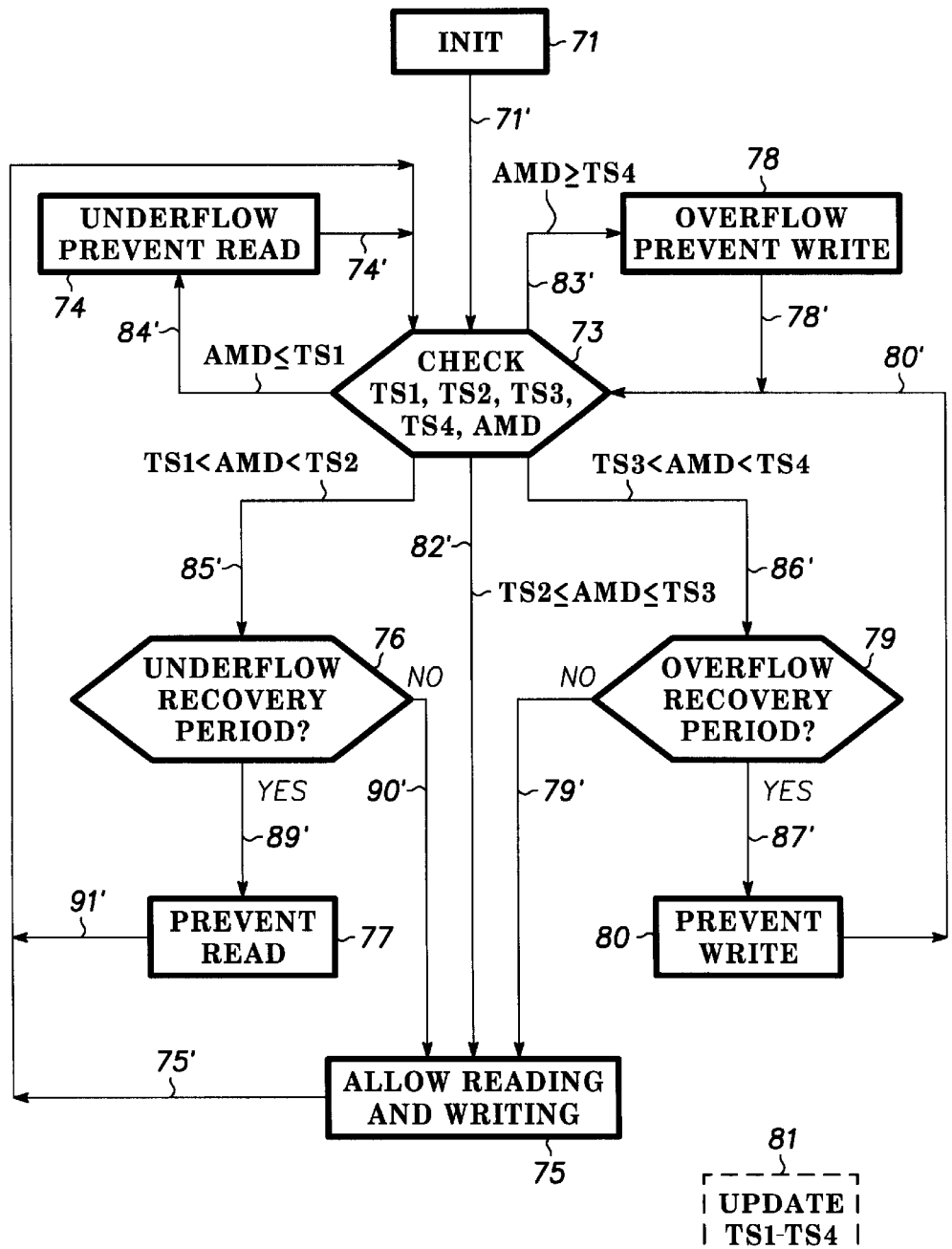
FIG. 6 is a flow chart showing a method for reassembling data cells, according to a preferred embodiment of the invention.

FIG.6 is a simplified flow chart diagram illustrating method 70 for reassembling data cells, according to a preferred embodiment of the invention. Preferably, method 70 comprises steps 71, 73, 74, 75, 76, 77, 78, 79, 80 and 81 illustrated by blocks. Solid lines 71', 74', 75', 78',79', 80', 82', 83', 84', 85', 86', 87', 89', 91', 90', coupling the steps indicate a preferred method flow.

Method 70 starts in step 71 of initializing, in which AMD is reset. Conveniently, AMD is reset by setting a receive pointer and a transmit pointer to a same location of Buffer 43. Preferably, Rx Pointer=Tx pointer=TS1.

Step 71 is followed by query step 73 of checking AMD and accordingly controlling the writing in and reading out of data cells to buffer 43.

If AMD≦TS1 then query step 73 is followed by step 74 of preventing data cells being stored within buffer 43 from being red out of buffer 43, allowing data cells to be written in buffer 43 and updating AMD accordingly. During step 74 buffer 43 is in a underflow status. A loop comprising of steps 73 and 74 is performed when buffer 43 underflows. Usually, AMD can not be lower than TS1 and an underflow occurs when AMD equals TS1.

If TS2≦AMD≦TS3 then query step 73 is followed by step 75 of allowing data cells to be written in buffer 43 and allowing data cells to be read out of buffer 43 and updating AMD accordingly.

If $TS1 \leq AMD \leq TS2$ then query step 73 is followed by query step 76 of checking whether a query step 73 was preceded by change in AMD from TS1 to TS2. Query step 76 checks if an underflow recovery period ended. If the answer is "yes" query step 76 is followed by step 75. Else query step 76 is followed by step 77 of preventing data cells from being read out of buffer 43, allowing data cells to be written in buffer 43 and updating AMD accordingly. A loop comprising of steps 73, 76 and 77 is performed during an underflow recovery period.

If $AMD \geq TS4$ then query step 73 is followed by step 78 of preventing data cells from being written in buffer 43, allowing data cells to be read out of buffer 43 and updating AMD accordingly. A loop comprising of steps 73 and 78 is performed when buffer 43 overflows. Usually, AMD can not be greater than TS4 and an overflow occurs when AMD equals TS4.

If $TS3<AMD<TS4$ then query step 73 is followed by query step 79 of checking whether a query step 73 was preceded by change in AMD from TS3 to TS4. Query step 79 checks if an overflow recovery period ended. If the answer is "yes" query step 79 is followed by step 75, else query step 79 is followed by step 80 of preventing data cells from being written in buffer 43, allowing data cells to be read out of buffer 43 and updating AMD accordingly. A loop comprising steps 73, 79 and 80 is performed during an overflow recovery period.

Dashed step 81 of adjusting either one of TS1, TS2, TS3 and TS4 can occur during, each step of method 70.

Method 70 allows data cells to be both read out of buffer 43 and be written in buffer 43, but during an underflow and an underflow recovery period, data cells cannot be read out of buffer 43 Data cells can not be written to buffer 43 during an overflow and an overflow recovery period.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an improved method and apparatus for reassembling a sequence of data cells from one communication channel into a stream of data to be sent to a second communication channel. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A reassembly unit adapted to receive data cells from a first communication channel, temporarily store the received data and to provide data cells to a second communication channel, in a manner that compensates for timing differences between a reception of data cells from the first communication channel and a provision of data cells to the second communication channel, the reassembly unit comprising:
   a buffer, adapted to receive data cells from the first communication channel and to provide data cells to the second communication channel, according to control signals provided by a control unit;
   a detector, coupled to the buffer, the detector is adapted to detect AMD, AMD reflecting an amount of data cells stored in the buffer, compare AMD to four thresholds and generate status signals reflecting a relationship between AMD and the four thresholds TS1, TS2, TS3 and TS4, TS1<TS2<TS3<TS4; and
   a control unit, coupled to the buffer and to the detector, for receiving the status signal and for controlling an access to the buffer; wherein
   (One) if AMD<TS1 the control unit prevents a data cells from being read out of the buffer and allows data cells to be written in the buffer;
   (Two) while AMD remains in a range of TS1<AMD<TS2 after reaching TS1, the control unit prevents data cells from being read out of the buffer and allows data to be written in the buffer;
   (Three) if $AMD \geq TS4$ the control unit prevents data cells from being written in the buffer and allows data cells to be read out of the buffer;
   (Four) while AMD remains in a range of TS3<AMD<TS4 after reaching TS4 the control unit prevents data cells from being written in the buffer and allows data cells to be read out of the buffer, and
   (Five) if $TS2 \leq AMD \leq TS3$ control unit allows data cells to be written to the buffer and allows data cells to be read out of the buffer.

2. The reassembly unit of claim 1 wherein the timing differences between a reception of data cells from the first communication channel and a provision of data cells to the second communication channel results from fluctuations in an reception time of data cells from the first communication channel.

3. The reassembly unit of claim 1 wherein the first communication channel is adapted to provide ATM data cells to the reassembly unit and the second communication channel is adapted to receive data cells with a constant bit rate.

4. The reassembly unit of claim 3 wherein an Rx pointer points to a first location in the buffer that stores a last data cell to be received by the buffer, an Tx pointer is used to point to a second location in the buffer that stores a next data cell to be provided to the second communication channel; and
   wherein AMD reflects a difference between the Tx pointer and the Rx pointer.

5. The reassembly unit of claim 1 wherein TS1, TS2, TS3 and TS4 can be altered during an operation of the reassembly unit.

6. A reassembly unit adapted to receive data cells from a first communication channel, temporarily store the received data and to provide data cells to a second communication channel, in a manner that compensates for timing differences between a reception of data cells from the first communication channel and a provision of data cells to the second communication channel, the reassembly unit comprising:
   a plurality of data buffers, adapted to receive data cells from the first communication channel and to provide data cells to the second communication channel, according to control signals provided by a control unit;
   a reassembly buffer, adapted to store a plurality of buffer descriptors, a buffer descriptor has a pointer that points to a data buffer in which data cells are written in and read out of;
   a detector, adapted to detect AMD, AMD reflecting an amount of data cells stored in the plurality of the data buffers, compare AMD to four thresholds and generate status signals reflecting a relationship between AMD and the four thresholds TS1, TS2, TS3 and TS4, TS1<TS2<TS3<TS4; and a control unit, coupled to the plurality of data buffers, to the reassembly buffer and to the detector, for receiving the status signal and for controlling an access to the plurality of data buffers; wherein (One) if AMD≦TS1 the control unit prevents a data cells from being read out of the plurality of data buffers and allows data cells to be written in the buffer;

(Two) while AMD remains in a range of TS1<AMD<TS2 after reaching TS1, the control unit prevents data cells from being read out of the plurality of data buffers and allows data to be written in the plurality of the data buffers;

(Three) if AMD≧TS4 the control unit prevents data cells from being written in the plurality of data buffers and allows data cells to be read out of the plurality of data buffers;

(Four) while AMD remains in a range of TS3<AMD<TS4 after reaching TS4 the control unit prevents data cells from being written in the plurality of the data buffers and allows data cells to be read out of the plurality of the data buffers; and (Five) if TS2≦AMD≦TS3 the control unit allows data cells to be written to the plurality of data buffers and allows data cells to be read out of the plurality of the buffers.

7. The reassembly unit of claim 6 wherein the detector is coupled to the reassembly buffer.

8. The reassembly unit of claim 6 wherein the detector is coupled to the plurality of data buffers.

9. The reassembly unit of claim 6 wherein the timing differences between a reception of data cells from the first communication channel and a provision of data cells to the second communication channel results from fluctuations in an reception time of data cells from the first communication channel.

10. The reassembly unit of claim 6 wherein the first communication channel is adapted to provide ATM data cells to the reassembly unit and the second communication channel is adapted to receive data cells with a constant bit rate.

11. The reassembly unit of claim 10 wherein an Rx pointer points to a first location in the plurality of data buffers that stores a last data cell to be received by the plurality of data buffers, a Tx pointer is used to point to a second location in the buffer that stores a next data cell to be provided to the second communication channel; and wherein AMD reflects a difference between the Tx pointer and the Rx pointer.

12. The reassembly unit of claim 6 wherein TS1, TS2, TS3 and TS4 can be altered during an operation of the reassembly unit.

13. A reassembly unit adapted to receive data cells from a first communication channel, temporarily store the received data and to provide data cells to a second communication channel, in a manner that compensates for differences between a transmission rate of the first communication channel and a reception rate of the second communication channel, the reassembly unit comprising:

a buffer, coupled to the first and the second communication channels;

a detector, coupled to the buffer, the detector is adapted to detect an amount AMD of data stored within the buffer, compare this amount to four thresholds and generate status signals reflecting a relationship between AMD and the four thresholds TS1, TS2, TS3 and TS4, TS1<TS2<TS3<TS4; and a control unit, coupled to the buffer and the detector, for receiving the status signal and for controlling an access to the buffer; wherein the control unit allows data cells to be written to and read from the buffer, wherein:

(One) the control unit prevents data cells from being read from the buffer during a underflow and an underflow recovery period, an underflow occurs when AMD=TS1, an underflow recovery period occurs between a moment in which an underflow ends and a moment in which AMD first reaches TS2;

(Two) the control unit prevents data cells from being written to the buffer during an overflow and an overflow recovery period, a overflow occurs when AMD=TS4, an overflow recovery period occurs between a moment in which an overflow ends and a moment in which AMD first reaches TS3; and (Three) else, the control unit allows data cells to be written to and be read from the buffer.

14. The reassembly unit of claim 13 wherein the differences between the transmission rate of the first communication channel and the reception rate of data of the second communication channel results from fluctuations in the transmission rate of the first communication channel.

15. The reassembly unit of claim 14 wherein the first communication channel is adapted to provide ATM data cells to the reassembly unit and the second communication channel is adapted to receive a constant bit rate data stream from the reassembly unit.

16. The reassembly unit of claim 15 wherein an Rx pointer points to a first location in the buffer in, which a last ATM cell to be received by the buffer is stored, an Tx pointer is used to point to a second location within the buffer, in which a next data cell to be provided by the buffer is stored; and wherein, a difference between the Tx pointer and the Rx pointer reflects AMD.

17. The reassembly unit of claim 13 wherein,TS1, TS2, TS3 and TS4 can be altered during an operation of the reassembly for unit.

18. A method for reassembling data cells, the data cells being received from a first communication channel, are stored and transmitted to a second communication channel in a manner that compensates for timing differences between a reception of data cells from the first communication channel and a provision of data cells to the second communication channel, the method comprising the steps of:

(a) initializing a reassembly unit, resetting a variable AMD, AMD reflecting an amount of data cells stored within a reassembly unit;

(b) checking a relationship between AMD and four thresholds TS1, TS2, TS3 and TS4; wherein (1) if AMD≦TS1 preventing data cells from being read out of the reassembly unit and allowing data cells to be written in the buffer, updating AMD and jumping to step 18(b);

(2) while AMD remains in a range of TS1<AMD<TS2 after reaching TS1, preventing data cells from being read out of the reassembly unit and allowing data cells to be written in the buffer; updating AMD and jumping to step 18(b);

(3) if AMD≧TS4 preventing data cells from being written in the reassembly unit and allowing data cells to be read out of the reassembly unit; updating AMD and jumping to step 18(b);

(4) while AMD remains in a range of TS3<AMD<TS4 after reaching TS4, preventing data cells from being written in the reassembly unit and allowing data cells to be read out of the reassembly unit; updating AMD and jumping to step 18(*b*); and (5) if TS2≦AMD≦TS3 allowing data cells to be written to the reassembly unit and allowing data cells to be read out of the reassembly unit; updating AMD and jumping to step 18(*b*).

19. The method of claim 18 wherein the differences between the transmission rate of the first communication channel and the reception rate of data of the second communication channel results from fluctuations in the transmission rate of the first communication channel.

20. The method of claim 18 wherein the first communication channel is adapted to provide ATM data cells and the second communication channel is adapted to receive a constant bit rate data stream.

21. The method of claim 20 wherein an Rx pointer points to a first location in the reassembly unit in which a last ATM cell to be received by the reassembly unit is stored, an Tx pointer is used to point to a second location within the reassembly unit, in which a next data cell to be provided by the reassembly unit is stored; and wherein, a difference between the Tx pointer and the Rx pointer reflects AMD.

22. The method of claim 18 further comprising a step of altering updating TS1, TS2, TS3 and TS4, the step being able to be executed during any other step of the method of claim 18.

* * * * *

UNITED STATES PATENT AND TRADEMARK OFFICE
CERTIFICATE OF CORRECTION

PATENT NO.    : 6,665,298 B1
DATED         : December 16, 2003
INVENTOR(S)   : Eran Kirzner et al.

It is certified that error appears in the above-identified patent and that said Letters Patent is hereby corrected as shown below:

Column 8,
Line 12, change "AMD<TS1" to -- AMD≤TS1 --.

Column 10,
Line 33, change "buffer in, which" to -- buffer in which --.
Line 40, change "wherein, TS1," to -- wherein TS1, --.

Signed and Sealed this

Twenty-seventh Day of July, 2004

JON W. DUDAS
*Acting Director of the United States Patent and Trademark Office*